(12) United States Patent
Ishizeki et al.

(10) Patent No.: US 7,816,827 B2
(45) Date of Patent: Oct. 19, 2010

(54) BRUSHLESS MOTOR

(75) Inventors: Masaki Ishizeki, Kiryu (JP); Hisashi Ishida, Maebashi (JP); Susumu Miyazaki, Niiza (JP); Kazushi Hamaya, Iruma-gun (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 12/264,314

(22) Filed: Nov. 4, 2008

(65) Prior Publication Data
US 2009/0134724 A1 May 28, 2009

(30) Foreign Application Priority Data
Nov. 5, 2007 (JP) .............................. 2007-287862

(51) Int. Cl.
*H02K 11/00* (2006.01)
(52) U.S. Cl. .......................................... 310/71; 336/67
(58) Field of Classification Search .................. 310/71; 336/67
See application file for complete search history.

(56) References Cited

U.S. PATENT DOCUMENTS

| 4,649,304 A | * | 3/1987 | Atherton et al. ............... 310/71 |
| 5,350,959 A | * | 9/1994 | Flaminio et al. ............... 310/71 |
| 7,714,470 B2 | * | 5/2010 | Kataoka et al. ................ 310/71 |
| 2005/0179329 A1 | * | 8/2005 | Okazaki et al. ................ 310/71 |
| 2006/0163959 A1 | * | 7/2006 | Ogawa et al. .................. 310/71 |
| 2008/0073987 A1 | * | 3/2008 | Kataoka et al. ................ 310/71 |
| 2008/0073988 A1 | * | 3/2008 | Kataoka et al. ................ 310/71 |
| 2008/0179975 A1 | * | 7/2008 | Kataoka et al. ................ 310/71 |
| 2009/0278414 A1 | * | 11/2009 | Gardner et al. ................ 310/71 |

FOREIGN PATENT DOCUMENTS

JP      2003-199279 A    7/2003

* cited by examiner

*Primary Examiner*—Quyen Leung
*Assistant Examiner*—Terrance Kenerly
(74) *Attorney, Agent, or Firm*—Arent Fox LLP

(57) ABSTRACT

A brushless motor is provided with: a tubular stator case; a stator core; a rotor rotatably supported via a bearing inside the stator core; a bracket which closes an opening at one end of the stator case; a coil bobbin around which a coil is wound is mounted on an inner peripheral surface of the stator core; a lead wire which feeds power to the coil; and a wiring substrate which relays a connection between one end of the lead wire and the coil, wherein: a drawn-out hole is formed on the bracket at the position corresponding to the connection point of said one end of the lead wire and the wiring substrate such that the other end of the lead wire is drawn outward; and a harness guide is provided on a peripheral edge of the drawn-out hole such that the drawn lead wire is bent and fixed.

3 Claims, 7 Drawing Sheets

BRUSHLESS MOTOR

BACKGROUND OF THE INVENTION

Priority is claimed on Japanese Patent Application No. 2007-287862, filed on Nov. 5, 2007, the contents of which are incorporated herein by reference.

1. Field of the Invention

The present invention relates to an inner rotor type brushless motor which has, for example, a rotor and a stator.

2. Description Of The Related Art

Generally, an inner rotor type brushless motor has a stator core fitted into and fixed to a stator case and a rotor rotatably provided with respect to the stator core, and includes permanent magnets at an outer peripheral portion thereof. This stator core includes a plurality of teeth which protrude radially inward. A coil is wound around these teeth. Electric current is supplied to the coil by electrically connecting a winding starting end or a winding finishing end of the coil with lead wires via a wiring substrate. As electric current flows into the coil, an attractive or repulsive force is generated between the rotor and the stator to rotate the rotor.

Meanwhile, the above-described lead wires are connected with the wiring substrate by soldering etc., and run to the outside of the motor. In a case where a tensile stress is acted on the lead wires, the stress reaches a joint portion of the lead wires in the wiring substrate, and it causes disconnection of the lead wire from the wiring substrate. Among this kind of brushless motor, there is one which is provided with a harness guide formed in a fork-like shape in the bracket which covers the stator core, the lead wires are fit in the harness guide, and thermoplastic resin is filled in the bracket so as to ensure the pulling resistance (for example, refer to Japanese Unexamined Patent Application, First Publication No. 2003-199279). Further, there is one in which the lead wires are slackened in the bracket and supported by a grommet with a plate such that the length of the lead wires allow tensile stress, and the slack of the lead wires prevents that the tensile stress reaches a joint portion of the lead wires in the wiring substrate.

In recent years, there has been a demand for a smaller and more lightweight brushless motor.

However, in the above-described brushless motor, since the lead wires are slackened in the bracket and supported by a grommet with a plate such that the length of the lead wires allow tensile stress, the space inside the bracket for the slackened lead wires is needed. Therefore, there is a problem in that the size of the motor becomes large.

Further, if a lead wire is disconnected from the wiring substrate, there is a problem in that short-circuiting is caused by contacting the disconnected lead wire with other lead wires or metal-parts.

Thus, the present invention has been made in view of the above-described circumstances, and the object of the invention is to provide a brushless motor capable of enduring a tensile stress which acts on the lead wires and securing insulation properties while being made small and lightweight.

SUMMARY OF THE INVENTION

In order to solve the above problems, the brushless motor according to the invention is provided with: a tubular stator case; a stator core fitted into the stator case; a rotor rotatably supported via a bearing inside the stator core; a bracket which closes an opening at one end of the stator case; a coil bobbin around which a coil is wound is mounted on an inner peripheral surface of the stator core; a lead wire which feeds power to the coil; and a wiring substrate which relays a connection between one end of the lead wire and the coil, wherein: a drawn-out hole is formed on the bracket at the position corresponding to the connection point of said one end of the lead wire and the wiring substrate such that the other end of the lead wire is drawn outward; and a harness guide is provided on a peripheral edge of the drawn-out hole such that the drawn lead wire is bent and fixed.

According to the above-described brushless motor, the lead wires connected with the coil via the circuit pattern of the wiring substrate are directly drawn out axially outward from the hole without drawing around through the inside of the bracket. Thereby, the space inside the bracket can be saved. Further, the harness guide is provided on a peripheral surface of the bracket, and the lead wires are bent and fixed with allowance so as to run along the harness guide. Thereby, even in a case where a tensile stress is acted on the lead wires, the stress can be prevented from reaching a joint portion of the lead wires in the wiring substrate.

Accordingly, it is possible to endure a tensile stress which acts on the lead wires, and the brushless motor can be made smaller and more lightweight.

It may be arranged such that the harness guide includes: a base portion which straddles the ridgeline of the bracket; and a plurality of partition walls formed integrally on the surface of the base portion, wherein the lead wire is accommodated in a slit formed between the mutually adjacent partition walls.

In this case, since a plurality of lead wires can be respectively separated by accommodating a plurality of lead wires in the slits formed between the partition walls, the lead wires do not contact each other. Further, the base portion of the harness guide is arranged so as to straddle the ridgeline of the bracket, and the lead wires do not contact metal-parts; that is, parts such as the stator core. Accordingly, insulation properties can be secured even in a case where the lead wires have come off from the wiring substrate.

DETAILED DESCRIPTION OF THE INVENTION

Figure 1:
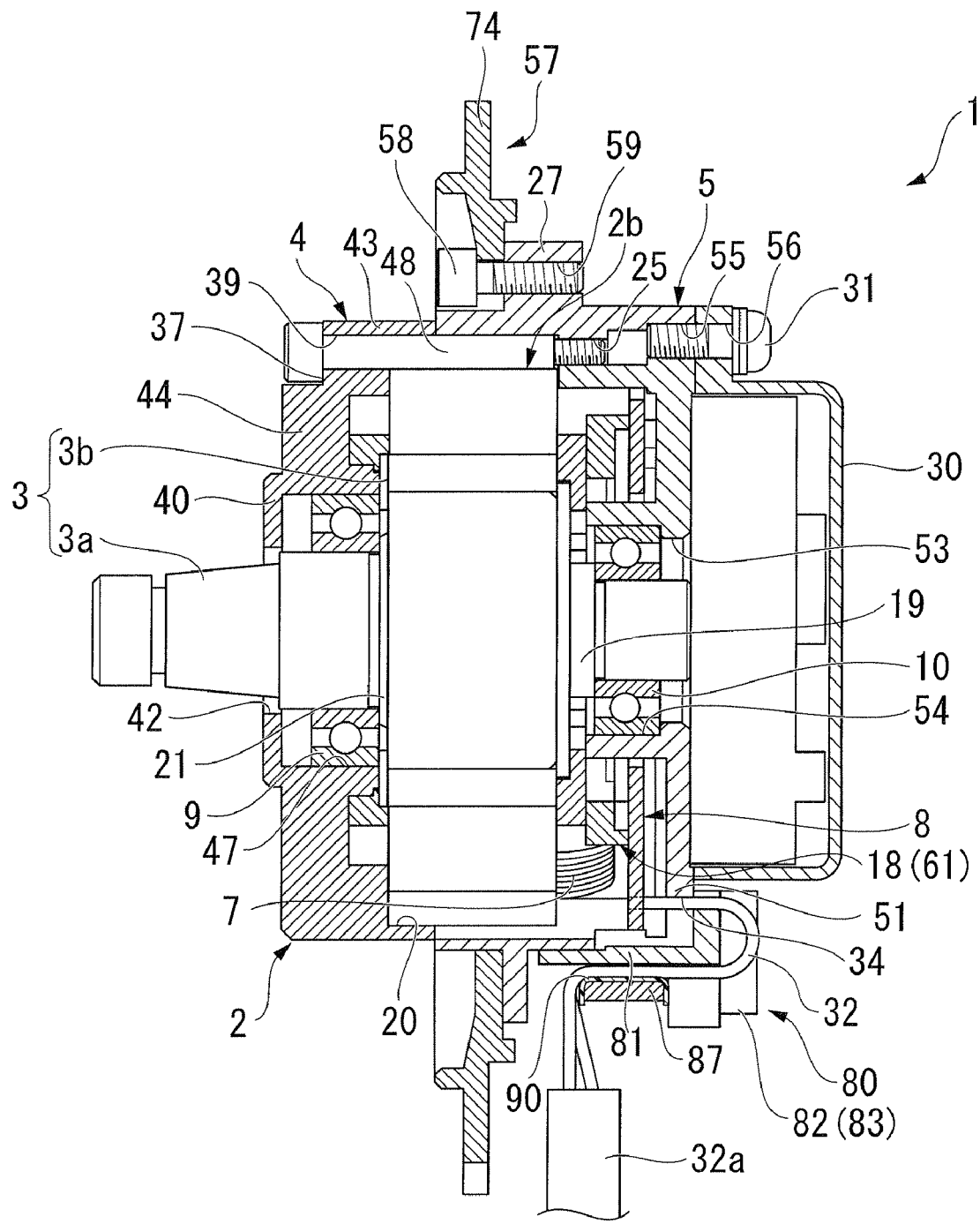
FIG. 1 is a sectional view of a brushless motor in an embodiment of the invention.
Figure 2:
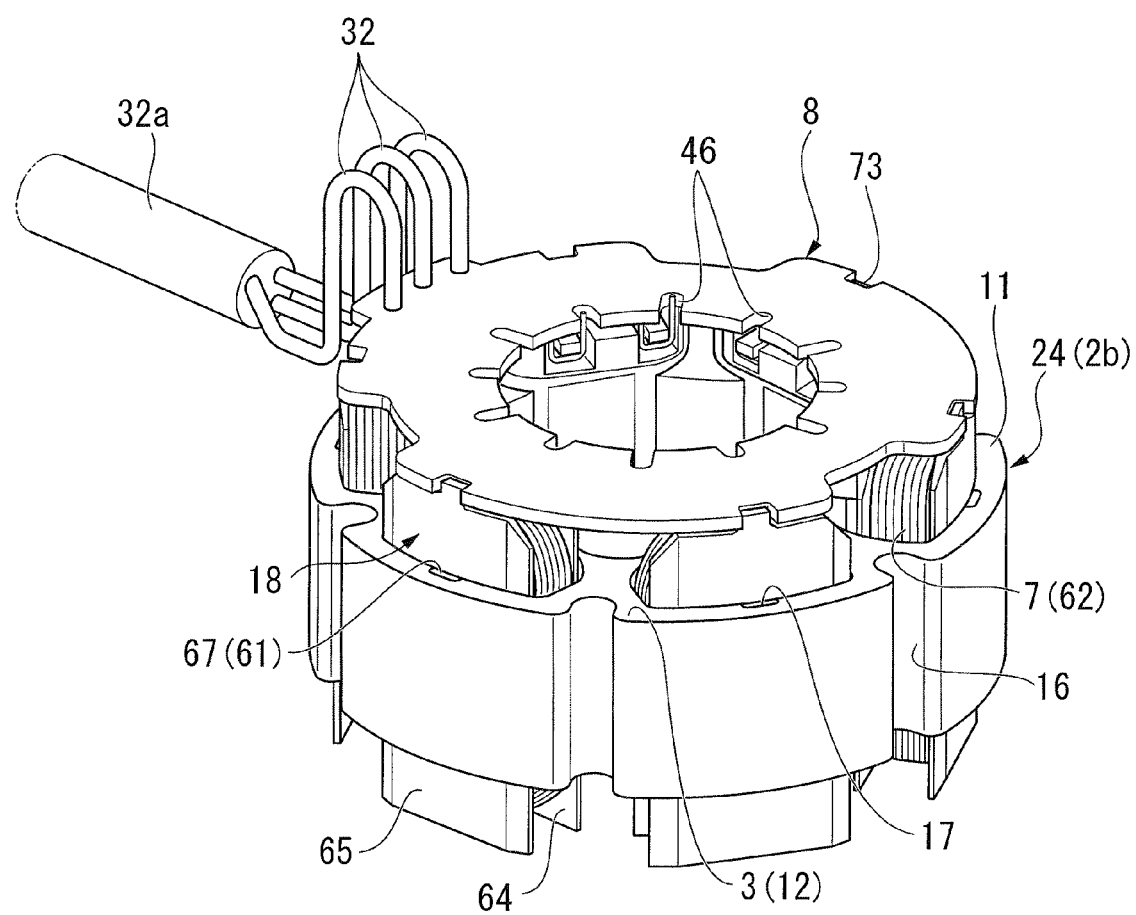
FIG. 2 is a perspective view of a stator core.

Next, an embodiment of the invention will be described with reference to the drawings. In the following description, the left side of FIG. 1 is defined as the front side (other end side), and the right side of FIG. 1 is defined as the rear side (one end side).

As shown in FIGS. 1 to 4, a brushless motor 1 of this embodiment is an inner rotor type brushless motor 1, and includes a cylindrical stator core 2b accommodated within a casing 2 composed of a front bracket 4 and a rear bracket 5, and a rotor 3 rotatably provided inside the stator core 2b.

The stator core 2b is formed by laminating a magnetic sheet material axially or pressing magnetic metal powder, and includes a tubular yoke portion 11. At an inner peripheral surface of the yoke portion 11, six commutating-pole teeth 12 which protrude radially inward are integrally formed at equal intervals in the peripheral direction of the yoke portion 11.

Also, clearance grooves 16 are formed at equal intervals in the peripheral direction along the axial direction of the stator core 2b in root portions 13 of the commutating-pole teeth 12. Further, dovetail grooves 17 are formed along the axial direction of the yoke portion 11 at the inner peripheral surface of the yoke portion 11. Each of the dovetail grooves 17 is formed in an intermediate position of the adjacent commutating-pole teeth 12, and is formed so as to be opened axially inward. A main core 24 is constituted by the yoke portion 11 and the commutating-pole teeth 12.

A split core 18 around which a coil 7 is wound is provided between the adjacent commutating-pole teeth 12. Six split cores 18 are provided at equal intervals in the peripheral direction of the yoke portion 11, and are arranged alternately with the commutating-pole teeth 12.

A front bracket 4 is provided on the front side of the stator core 2b so as to accommodate the front side. The front bracket 4 is formed in the shape of a bottomed tube from, for example, aluminum having a high heat transfer rate, and is constituted by a peripheral wall 43 and an end portion (end face) 44.

The peripheral wall 43 of the front bracket 4 is formed thickly, and a stepped portion 20 of which the internal diameter is increased is formed at a peripheral edge of the peripheral wall. An end face of the stator core 2b is abutted against an end face of the peripheral wall 43, and the stepped portion 20 is fitted on the stator core 2b.

A boss 40 is formed axially outward at the radial center of the front bracket 4. An insertion hole 42 for allowing the other end side of the shaft 3a to be inserted therethrough is formed at the radial center of the boss 40, and the axial inside of the insertion hole 42 is formed as a bearing housing 47.

In the rotor 3, a substantially cylindrical magnet 3b is fitted onto and fixed to the shaft 3a having stepped portions 19 and 21 at both ends thereof. The magnet 3b is magnetized such that its pole may change in order in the peripheral direction. A bearing 9 which rotatably supports the shaft 3a is provided at one end of the shaft 3a. The bearing 9 is press-fitted such that an end face at an inner ring thereof is abutted against the stepped portion 21 at one end of the shaft 3a.

Also, the other end side of the shaft 3a is inserted through the insertion hole 42 such that the bearing 9 press-fitted into the shaft 3a is accommodated in the bearing housing 47. Further, clearance portions 37 which are cut out along the axial direction are formed at a peripheral edge of the front bracket 4, and set bolt holes 39 are formed in correspondence with the above-described clearance grooves 16.

On the other hand, a front bracket 5 is provided on the rear side of the stator core 2b so as to accommodate the rear side. The rear bracket 5 is formed in the shape of a bottomed tube made from, for example, aluminum having a high heat transfer rate, and is constituted by a peripheral wall 50 and an end portion (end face) 51.

The axial center of the end portion 51 of the rear bracket 5 is formed with an insertion hole 53 for allowing one end of the rotor 3 to be inserted therethrough. A bearing housing 54 is formed axially inside the insertion hole 53, and a bearing 10 which rotatably supports the shaft 3a is press-fitted into the bearing housing. The bearing 10 is press-fitted such that an end face at an outer ring thereof is abutted against the end portion 51 of the rear bracket 5, and is press-fitted such that an end face at an inner ring thereof is abutted against the stepped portion 19 at the other end of the shaft 3a.

An outer peripheral surface of the peripheral wall 50 of the rear bracket 5 is formed with a flange portion 27 which extends radially outward. A plurality of bolt holes 59 are formed along the peripheral direction at the flange portion 27. Also, an attachment bracket 57 is fastened and fixed to the flange portion 27 with bolts 58. The attachment bracket 57 has a plurality of attachment pieces 74 along the peripheral direction, and the brushless motor 1 is fixed to an external device by inserting bolts (not shown) through attachment holes 28 (refer to FIG. 4) formed in the attachment pieces 74.

Set bolt holes 25 are formed in correspondence with the above-described set bolt holes 39 along the peripheral direction axially inside the rear bracket 5. By inserting and fastening the set bolts 48 from the set bolt holes 39, the front bracket 4 and the rear bracket 5 are connected and their relative positions are determined, and the casing 2 accommodating the stator core 2b is constructed. Heads of the set bolts 48 are accommodated in the clearance portions 37, and thereby become flush with the end portion 44 without protruding from the end portion 44 of the front bracket 4. Further, bolt holes 55 are also formed axially outside the rear bracket 5.

A cover 30 is provided axially outside the rear bracket 5. The cover 30 covers the end of the rotor 3 at the rear bracket 5, and an optical encoder fixed to this end. The optical encoder is used to detect the rotation angle of the rotor 3. The cover 30 is fastened and fixed by inserting bolts 31 into bolt holes 56 formed in correspondence with the above-described bolt holes 55. A rotor position detecting method of the brushless motor 1 in this embodiment is not limited to the optical encoder, but may be carried out by a magnetic encoder, a resolver, a Hall IC, and a sensor magnet, and may be carried out by sensor-less driving.

Figure 3:
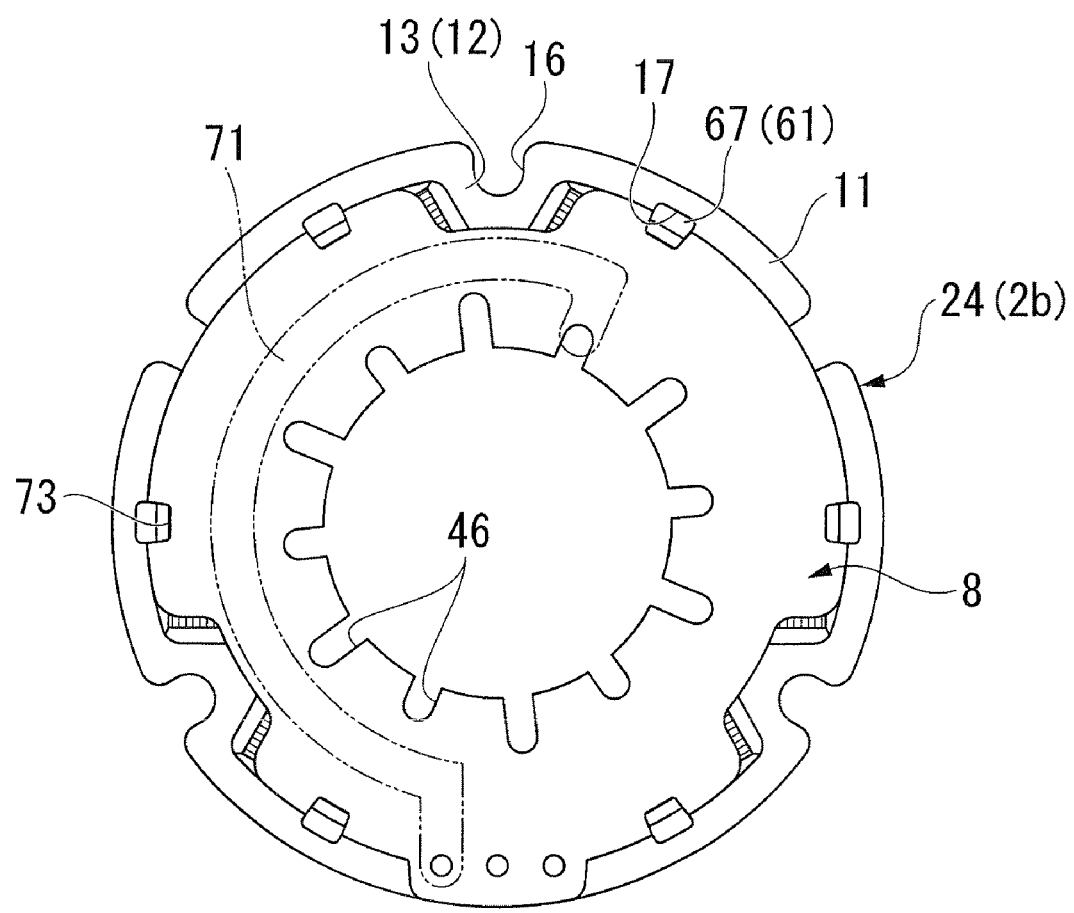
FIG. 3 is a plan view showing a stator case from the rear side.
Figure 4:
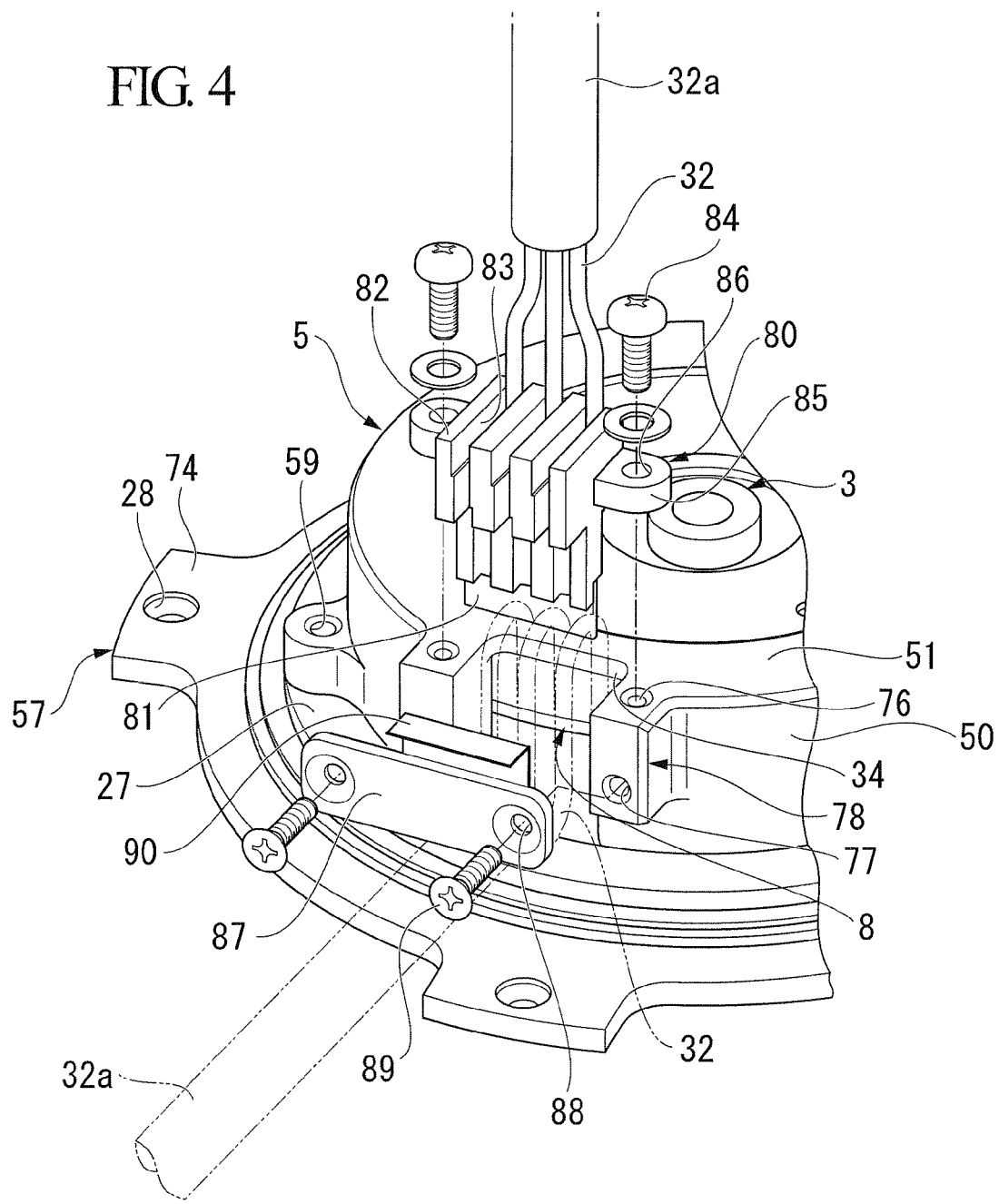
FIG. 4 is an exploded perspective view of a rear bracket.
Figure 5:
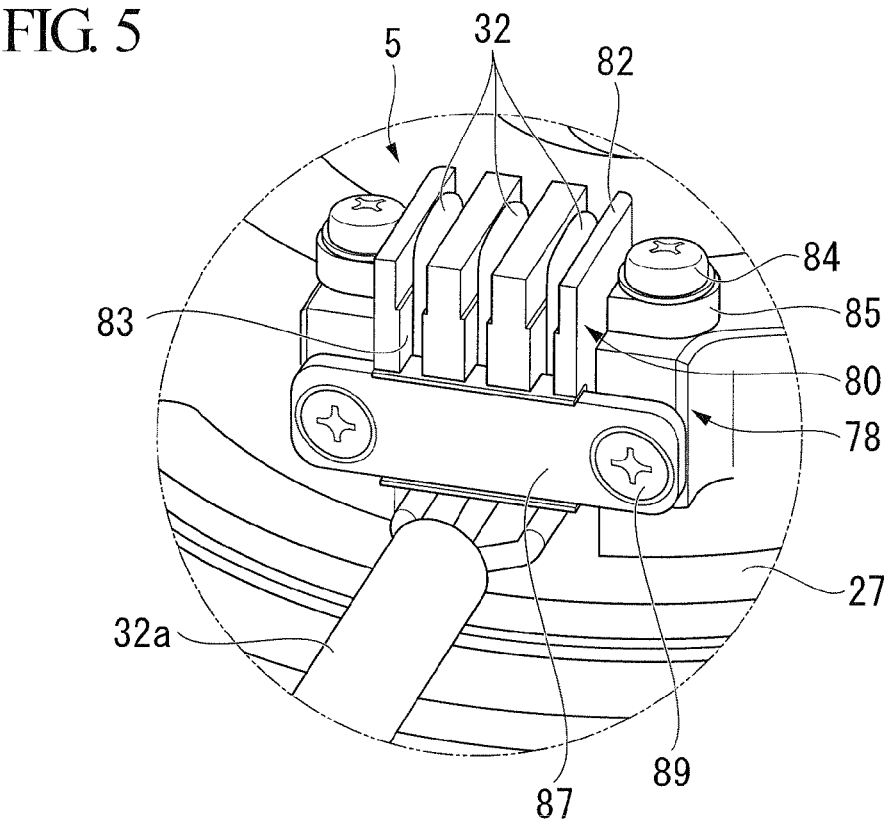
FIG. 5 is a partially perspective view of the rear bracket.
Figure 6:
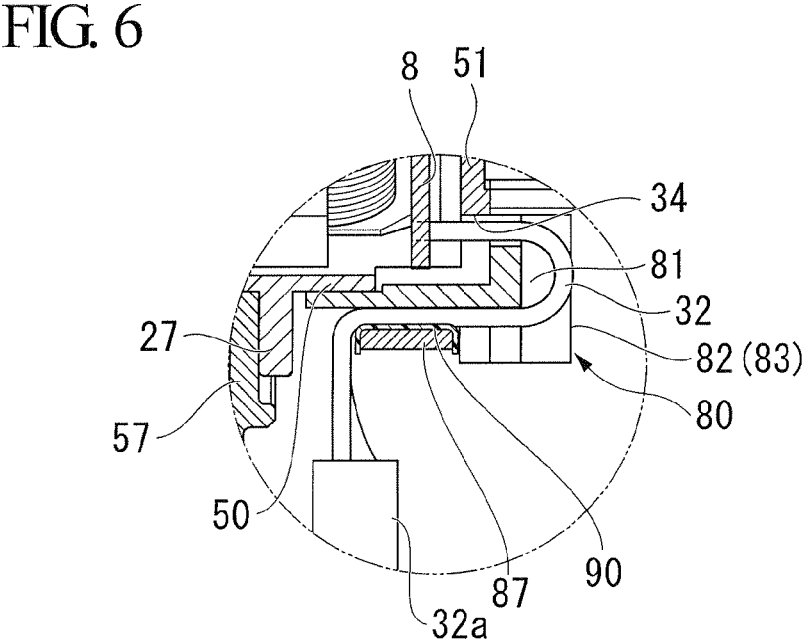
FIG. 6 is a sectional view of a harness guide.
Figure 7:
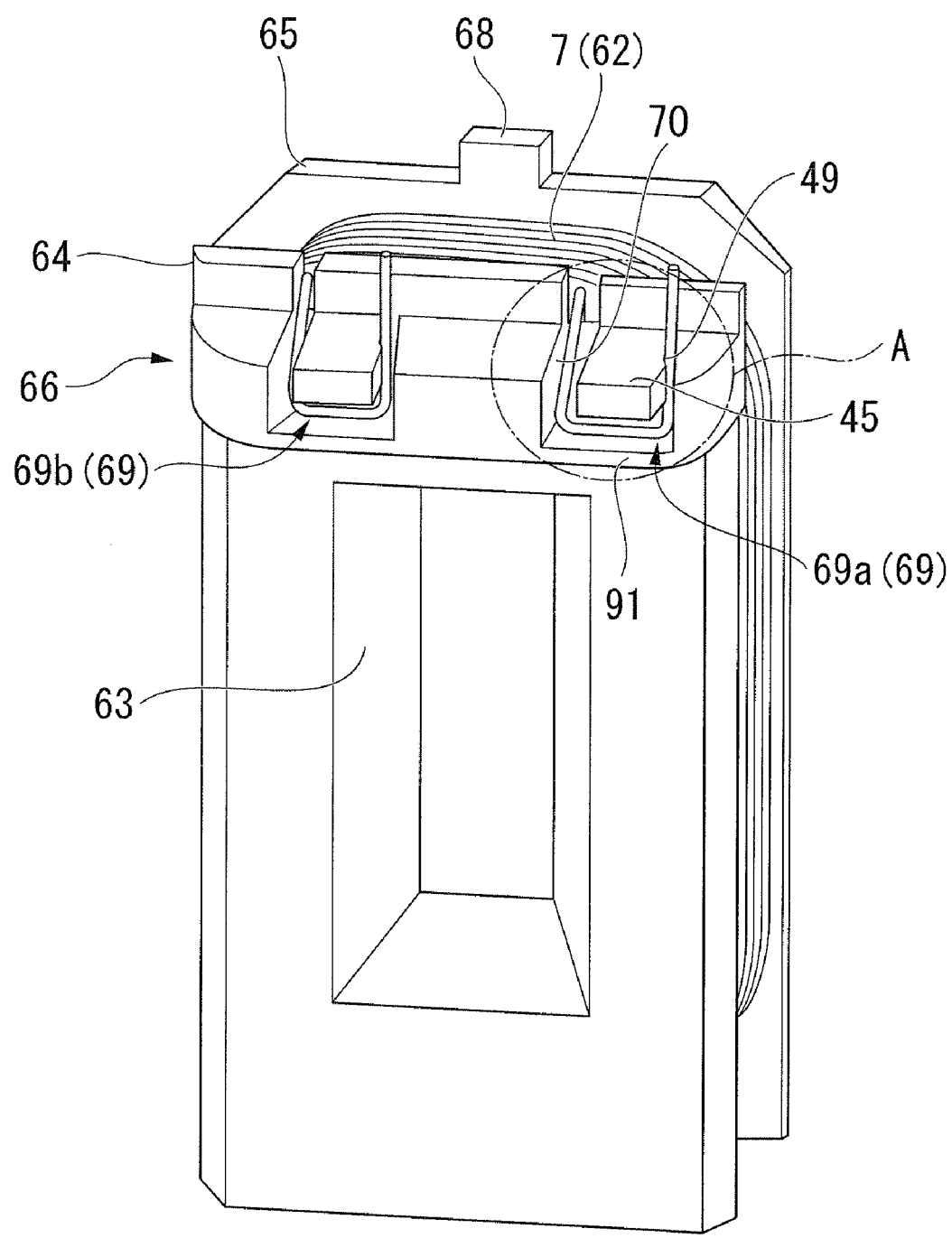
FIG. 7 is a perspective view of a coil bobbin.
Figure 8:
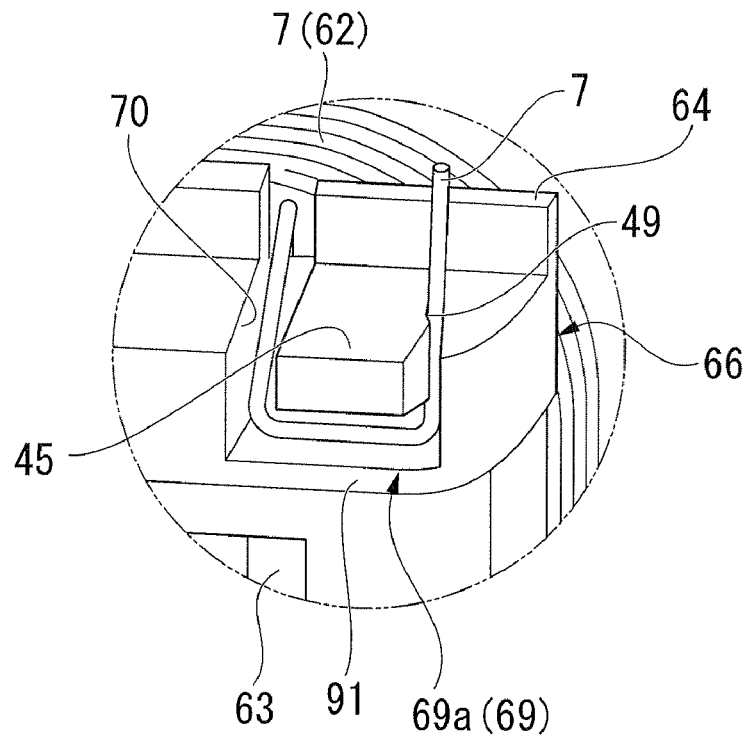
FIG. 8 is an enlarged view of a portion A of FIG. 7.
Figure 9:
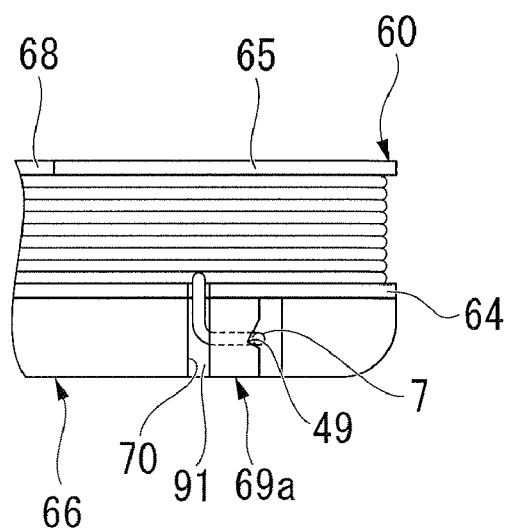
FIG. 9 is a plan view of the coil bobbin.

A substantially disc-like wiring substrate 8 is provided at the inner peripheral side of the peripheral wall 50 of the rear bracket 5 and at the outer peripheral side of the bearing housing 54. The wiring substrate 8 supplies external power to the coil 7, and a circuit pattern 71 corresponding to a U phase, a V phase, and a W phase is laminated on the surface (one layer is shown in FIG. 3) of the substrate. Three lead wires 32 corresponding to the U phase V phase, and W phase, which are drawn around from an external power source (not shown), are joined to the outer peripheral side of the wiring substrate 8, and winding starting and finishing ends of the coil 7 wound around the split core 18 via the circuit pattern 71 of the wiring substrate 8 are connected electrically. A plurality of U-shaped grooves 46 opened to the internal diameter side of the wiring substrate 8 along the peripheral direction are formed axially inside the wiring substrate 8. The depth of the U-shaped groove 46 is formed so as to correspond to the drawn-out position of the coil 7, and specifically, the U-shaped grooves 46 which are different in depth are alternately formed. Further, a plurality of (for example, six) cutout portions 73 are formed at equal intervals along the peripheral direction at an outer peripheral portion of the wiring substrate 8. Reference numeral 32a in the drawing is a covering tube which bundles and covers the lead wires 32.

As shown in FIGS. 1 to 3 and FIGS. 6 to 8, the above-described split core 18 includes a coil bobbin 60 around which the coil 7 is wound, and a split tooth 61 which is mounted on the coil bobbin 60. The split tooth 61 is a member which is T-shaped in plan view, and one end thereof is formed with a projection 67 which can fit into the dovetail groove 17 of the main core 24.

The coil bobbin 60 is made of a material having an insulating property, such as resin, and includes a rectangular tubular winding portion 62 around which the coil 7 is wound. A central portion of the coil bobbin 60 is formed with a rectangular mounting hole 63 which passes through the coil bobbin 60 in its width direction (the radial direction of the stator core 2b), and this central portion is mounted with the split tooth 61.

Both peripheral edges of the winding portion 62 are formed with an inner flange portion 64 and an outer flange portion 65 which extend outward.

Here, a protruding portion 68 is formed on the axial center along the longitudinal direction (axial direction of the stator core 2b) of the coil bobbin 60 at a peripheral edge of the outer flange portion 65. The protruding portion 68 has a rectangular shape in which a portion of the outer flange portion 65 extends upward (upward in FIG. 7), and is constructed so as to be capable of fitting into a corresponding cutout portion 73 of the wiring substrate 8 described above. After the wiring substrate 8 has the circuit pattern 71 and the lead wires 32 joined to its surface, the wiring substrate is connected in a state where the cutout portion 73 of the wiring substrate 8 and the protruding portion 68 of the coil bobbin 60 are made to fit into each other, and in a state of being made to abut the peripheral edge of the coil bobbin 60 by an adhesive, heat calking, etc.

On the other hand, an enlarged member 66 which bulges in the width direction (the radial inside of the stator core 2b) of the inner flange portion 64 is formed at one end (upper portion in FIG. 7) of the peripheral edge of the inner flange portion 64 of the coil bobbin 60. The enlarged member 66 is formed with a pair of guide portions 69 which respectively hold the winding starting end and winding finishing end of the coil 7 and guide them to the wiring substrate 8. One of the guide portions 69 is a guide portion 69a of the winding starting end of the coil 7, and the other thereof is a guide portion 69b of the winding finishing end of the coil 7.

The guide portion 69a is formed with a groove 70 obtained by notching a portion of the peripheral edge of the inner flange portion 64 to the enlarged member 66 along the axial direction and notching the enlarged member 66 in a recessed shape.

The groove 70 draws out the coil 7 from the winding portion 62 of the coil bobbin 60, and guides it towards the wiring substrate 8.

Further, a claw 45 which extends so as to face the inside of the groove 70 and is rectangular in plan view is formed in the groove 70. The claw 45 is held as the coil 7 drawn around into the groove 70 is folded back, and is guided to the wiring substrate 8, and a cutout portion 49 which is engaged with the folded-back coil 7 is formed on one side along the longitudinal direction of the claw.

Further, both sides of the groove 70 are surrounded by the enlarged member 66, and a partition wall 91 in which the enlarged member 66 is made to remain without passing therethrough is also formed below the groove 70. The partition wall 91 isolates the coil 7 from metal parts, such as the stator core 2b arranged around the guide portion 69a. Although the construction of the guide portion 69a has been described, the construction of the guide portion 69b is also the same, therefore the description thereof is omitted.

Meanwhile, both the guide portions 69a and 69b are arranged at different distances from the axial center along the longitudinal direction of the coil bobbin 60, and are not symmetrically disposed with respect to the axial center. Specifically, the guide portion 69a on the side of the winding starting end is disposed in a state where the notching position of the groove 70 corresponds to the winding starting position in the winding portion 62 such that the coil 7 is naturally drawn around the winding portion 62. On the other hand, the guide portion 69b on the side of the winding finishing end is disposed nearer the axial center of the coil bobbin 60 than the guide portion 69a on the side of the winding starting end. This is provided so as to keep the coil 7 drawn around the guide portion 69a on the side of the winding starting end and the coil 7 wound around the guide portion 69b on the side of the winding finishing end of the adjacent coil bobbin 60 from contacting each other after the coil bobbin 60 is assembled in the stator core 2b.

As shown in FIGS. 1, and 4-6, a drawn-out hole 34 is formed over the ridgelines of the end portion 51 and the peripheral wall 50, at the outer peripheral side (the lower side in FIG. 1) of the end portion 51 of the rear bracket 5. This drawn-out hole 34 is arranged in correspondence with a joint portion of the lead wires 32 and the wiring substrate 8, and the lead wires 32 joined to the wiring substrate 8 are directly drawn out axially outward. A holding portion 78 in which a pair of screw holes 76 and 77 are formed is respectively formed at the end portion 51 and the peripheral wall 50 of the rear bracket 5, at the outer surface of the rear bracket 5, and on both sides of the drawn-out hole 34 in the peripheral direction.

Here, a harness guide 80 made of an insulating material, such as resin, is provided in the drawn-out hole 34 so as to extend between both the holding portions 78. The harness guide 80 includes a substantially L-shaped base portion 81 which is bent in correspondence with the ridgeline of the rear bracket 5. One end of the base portion 81 is arranged at a position where the drawn-out hole 34 is opened to about the thickness of the lead wires 32, and the other end thereof extends to a position which approaches the flange portion 27 along the outer peripheral surface of the peripheral wall 50 of the rear bracket 5.

Four partition plates 82 are arrayed in the width direction of the base portion 81 at one end thereof. The partition plates 82 are ones in which plates which are rectangular in side view are integrally formed in the base portion 81, and extend axially outward of the rear bracket 5. Three slits 83 are formed between the respective partition plates 82. Three lead wires 32 drawn out axially outward from the drawn-out hole 34 are bent within the slits 83, respectively, so as to run along the base portion 81. Specifically, the lead wires are folded back in the U-shape (about 180°) with a slight allowance at one end of the base portion 81, and are drawn around toward the axial inside so as to run along the other end of the base portion 81.

Attachment pieces 85 which are fastened to the screw holes 76 formed in the holding portions 78 with screws 84 are formed in opposite partition plates 82 in the harness guide 80. A circular hole 86 is formed in each attachment piece 85, and the harness guide 80 is fixed to the rear bracket 5 by inserting and fastening the screw 84 into the circular hole 86 via a washer.

A fixing plate 87 which pinches the lead wires 32 drawn around so as to run along the other end of the base portion 81 via an insulating sheet 90 is provided at the other end of the base portion 81. This fixing plate 87 is a substantially oblong thin plate of which the peripheral edge has been subjected to chamfering, and screw holes 88 which are counter-bored in correspondence with the screw holes 77 of the holding portion 78 are formed on both sides along the longitudinal direction. The fixing plate 87 is fixed to the rear bracket 5 by inserting and fastening screws 89 into the screw holes 88. Also, the lead wires 32 are bent downward (downward in FIG. 1) by 90° at the peripheral edge of the fixing plate 87. In this case, the lead wires 32 which are sandwiched by the other end of the base portion 81 in the harness guide 80 and the insulating sheet 90 do not contact metal parts, such as the rear bracket 5.

As such, according to the above-mentioned embodiment, the lead wires 32 connected with the coil 7 via the circuit pattern 71 of the wiring substrate 8 are directly drawn out axially outward from the hole 34 without drawing around through the inside of the rear bracket 5. Thereby, the space inside the rear bracket 5 can be saved compared with a case where the lead wires 32 are drawn around the inside of the rear bracket 5 and then drawn out to the outside like the related art. Accordingly, since the axial length of the brushless motor 1 can be shortened, the brushless motor 1 can be made smaller and more lightweight.

Also, the harness guide 80 is provided so as to straddle the drawn-out hole 34 of the rear bracket 5, and the lead wires 32 are bent and fixed with allowance so as to run along the harness guide 80. Thereby, even in a case where a tensile stress has acted on the lead wires 32, the stress can be prevented from reaching a joint portion of the lead wires 32 in the wiring substrate 8. Accordingly, it is also possible to endure a tensile stress which acts on the lead wires 32.

Moreover, a plurality of lead wires 32 can be respectively separated by accommodating a plurality of lead wires 32 in the slits 83 formed between the partition walls 82. Further, the base portion 81 of the harness guide 80 which is L-shaped in sectional view is arranged so as to straddle the ridgeline of the rear bracket 5, and the lead wires 32 do not contact metal-parts; that is, parts such as the stator core 2b, and the lead wires 32 do not contact each other because they are sandwiched via the insulating sheet 90. Accordingly, insulation properties can be secured even in a case where the lead wires 32 have come off from the wiring substrate 8.

In addition, the guide portions 69a and 69b which hold the winding starting end or the winding finishing end of the coil 7 to guide the wiring substrate 8 are formed radially inside the coil bobbin 60. Thereby, the guide portions do not protrude axially outward compared with a case where pins are provided as conducting terminals with lead wires like the related art. Therefore, the axial length of the coil bobbin 60 can be shortened. That is, since the coil 7 is guided by the groove 70 formed by notching the coil bobbin 60, the peripheral edges of the inner flange portion 64 and outer flange portion 65 of the coil bobbin 60 become flush with each other.

Moreover, the coil 7 is drawn around the guide portions 69a and 69b, and is joined to the U-shaped groove 46 of the wiring substrate 8. Thereby, the wiring substrate 8 is connected in a state of being made to abut the peripheral edges of the inner flange portion 64 and outer flange portion 65 of the coil bobbin 60. Thereby, it is possible to secure electrical connection with the lead wires 32 drawn in from outside via the circuit pattern 71 while reducing the axial attachment margin of the wiring substrate 8.

Accordingly, since the axial length of the brushless motor 1 can be shortened without requiring complicated machining, the brushless motor 1 can be made small and lightweight while maintaining motor output.

Further, the coil 7 drawn around to the guide portions 69a and 69b can be prevented from falling out by engaging the coil 7 with the cutout portion 49 of the claw 45. Therefore, distorted winding of the coil 7 can be prevented. Moreover, the drawn-out position from the coil 7 to the wiring substrate 8 is determined as the coil 7 is engaged with the cutout portion 49. Therefore, the positioning between the coil 7 and the U-shaped groove 46 of the wiring substrate 8 can be easily performed, and assembling performance can also be improved.

Further, the positioning between the wiring substrate 8 and the stator core 2b can be easily performed by forming the protruding portion 68 which can fit into the cutout portion 73 of the wiring substrate 8 at the peripheral edge of the outer flange portion 65. Therefore, assembling performance can be improved. That is, the axial length of the brushless motor can be shortened without requiring complicated machining, and the brushless motor 1 can be made small and lightweight while maintaining output.

Moreover, the side of the groove 70 of the guide portion 69a or 69b is surrounded by the enlarged member 66, and the partition wall 91 in which the enlarged member 66 is made to remain can also be formed below the groove 70. Therefore, the guide portions 69a and 69b will be surrounded in three directions including both sides and the lower side of the groove 70. Thereby, even if a case where winding of the coil 7 is distorted occurs, the coil can be prevented from contacting metal parts arranged at the coil bobbin 60. Accordingly, insulation properties of the coil 7 can be secured, and short-circuiting of the coil 7 or damage to the coil 7 can be prevented.

It should be understood that the invention is not limited to the above-described embodiment, but various modifications may be made to the above-described embodiment without departing from the spirit of the invention.

For example, in this embodiment, the case where the lead wires are fixed by the fixing plate via the insulating sheet have been described. However, a construction in which the lead wires are inserted through a grommet, and are fixed by the fixing plate via the grommet may be adopted.

Further, in this embodiment, the guide portion is constituted by a groove and a claw. However, suitable design changes can be made if the guide does not protrude axially outward of the coil bobbin. Further, the U-shaped groove, screw hole, etc. which are formed in the wiring substrate, etc., may be formed in the shape of a circular hole or a long hole.

While preferred embodiments of the invention have been described and illustrated above, it should be understood that these are exemplary of the invention and are not to be considered as limiting. Additions, omissions and substitutions, and other modifications can be made without departing from the spirit or scope of the present invention. Accordingly, the invention is not to be considered as being limited by the foregoing description, and is only limited by the scope of the appended claims.

What is claimed is:

1. A brushless motor comprising:
 a tubular stator case;
 a stator core fitted into the stator case;
 a rotor rotatably supported via a bearing inside the stator core;
 a bracket which closes an opening at one end of the stator case;
 a coil bobbin around which a coil is wound and which is mounted on an inner peripheral surface of the stator core;
 a lead wire which feeds power to the coil;
 a wiring substrate which relays a connection between one end of the lead wire and the coil,
 a drawn-out hole which is formed on the bracket at a position corresponding to a connection point of said one end of the lead wire and the wiring substrate; and
 a harness guide which is provided at an outer surface of the bracket so as to straddle the drawn-out hole in a peripheral direction of the stator core, wherein
 the lead wire is drawn outward from the connection point in an axial direction of the stator core through the drawn-out hole, and
 the drawn lead wire is bent by the harness guide and fixed on the harness guide.

2. The brushless motor according to claim 1, wherein the harness guide includes:

a base portion which straddles the ridgeline of the bracket; and a plurality of partition walls formed integrally on the surface of the base portion, wherein the lead wire is accommodated in a slit formed between the mutually adjacent partition walls.

3. The brushless motor according to claim 1, wherein the lead wire is folded back in a U-shape at one end of the base portion.

* * * * *